United States Patent Office 3,705,862
Patented Dec. 12, 1972

3,705,862
WATER-SOLUBLE BINDERS PREPARED FROM PHENOLIC RESIN AND MONO-OLEFINICALLY UNSATURATED ACID
Gerhard Stieger, Wiesbaden, and Josef Flasch, Mainz-Bischofsheim, Germany, assignors to Reichhold-Albert-Chemie AG, Hamburg, Germany
No Drawing. Filed Nov. 10, 1969, Ser. No. 875,569
Claims priority, application Germany, Nov. 13, 1968, P 18 08 503.5
Int. Cl. C09d 3/54, 5/24
U.S. Cl. 260—19 UA                    10 Claims

ABSTRACT OF THE DISCLOSURE

A composition suitable for use as a water-soluble binder comprising the product obtained by reacting a mono-olefinically unsaturated at most dicarboxylic acid having not more than 6 carbon atoms with a phenolic resin, said phenolic resin being obtained by condensing, in the presence of an acid catalyst, (1) an at most trihydric phenol containing not more than one phenolic hydroxy group per benzene nucleus and containing at least one hydrocarbon substituent the substituents having altogether up to 12 carbon atoms, (2) formaldehyde and (3) an ester of (3a) a fatty acid having from 12 to 30 carbon atoms and (3b) a polyhydric aliphatic alcohol having 2 to 14 carbon atoms, an aqueous solution for use in electrophoretic coating containing an amine or quaternary ammonium neutralization product of said reaction product and a process for preparing said reaction product.

---

This invention is concerned with improvements in or relating to binders and, in particular, with water-soluble binders suitable for use in the production of surface coatings.

Novolaks are commonly used as binders in surface coatings and may be prepared by reacting phenol or a homologue thereof with formaldehyde and a fatty acid ester in the presence of an acid catalyst in an organic solvent. However, such resins are neither water-soluble nor are they water-dispersible and, as such, are unsuitable for use in aqueous coating compositions.

Binders suitable for use in stampable stratified bodies of fabric or paper sheets may be prepared by condensing a mixture of cresols, xylenols, formaldehyde and drying oil in the presence of an amino compound and mixing the condensation product with the product obtained by condensing o-cresol, formaldehyde and a drying oil in an alkaline medium. The cresol condensation products thereby obtained are hardenable because of their alkaline reaction and they may also be plasticised with oil. However, such condensation products cannot be used as binders in real aqueous solutions. Additionally, the storage stability of the product is inadequate.

According to the present invention there is provided a composition suitable for use as a water-soluble binder comprising the product obtained by reacting a monoolefinically unsaturated mono- or di-carboxylic acid having not more than 6 carbon atoms with a phenolic resin, said phenolic resin being obtained by condensing, in the presence of an acid catalyst, (1) an at most trihydric phenol containing not more than one phenolic hydroxy group per benzene nucleus and containing at least one hydrocarbon substituent, (2) formaldehyde and (3) an ester of a fatty acid having from 12 to 30 carbon atoms and a polyhydric aliphatic alcohol.

It is an advantage of the present invention that the binder may be prepared from substituted phenolic resins which are produced by a smooth and easily controllable condensation reaction which proceeds with an easily controllable rise in viscosity. Thus phenolic resins having a substantially uniform and reproducible viscosity may be prepared. A suitable viscosity for the phenolic resin to be esterified with the carboxylic acid is from 100 to 800, preferably from 400 to 600 cp. (as measured on a 50% solution of the resin in ethylene glycol monobutylether at 20° C. ( which viscosity may surely be obtained. These phenolic resins may be esterified with the said unsaturated mono- or dicarboxylic acid without any difficulty. Therefore an especially simple course of the reaction is possible.

The unsaturated carboxylic acid is, preferably, fumaric acid. Other suitable unsaturated carboxylic acids include those having 4 or 5 carbon atoms, such as maleic, itaconic, citraconic and aconitic acid or mixtures of two or more thereof. If the unsaturated carboxylic acid is a dicarboxylic acid preferably not more than one of the carboxy groups is esterified, so that the resulting halfesters possess one free carboxylic group which imparts a real water-solubility to the binder. Surprisingly, $\alpha,\beta$-olefinically-unsaturated monocarboxylic acids such as acrylic or methacrylic acid may also be used to produce products having good water-solubility.

Suitable esters for use in the condensation include esters of synthetic or naturally occurring fatty acids with polyhydric aliphatic alcohols. The naturally occurring fatty acids are preferably derived from drying or semidrying oils such as, for example, linseed oil, wood oil, soya bean oil, groundnut oil, dehydrated castor oil, cashew nutshell oil, oiticica oil or tall oil. Suitable polyhydric alcohols having 2 to 14 carbon atoms include diols, especially glycols such as ethylene glycol, the propane diols, the butane diols, the hexane diols; triols such as the hexane triols, glycerol, trimethylolethane or trimethylolpropane; pentaerythritol or dipentaerythritol.

Suitable hydrocarbon substituted phenols include alkyl phenols and phenols having several alkyl groups, or aryl phenols in each case the hydrocarbon substituents having up to 12 carbon atoms and preferably they altogether have up to 12 carbon atoms outside the phenolic nucleus. Examples of such phenols include the various cresols, butyl phenols, nonyl phenols and phenyl phenols. The term "aryl phenol" also includes alkyl aryl phenols. Other suitable hydrocarbon substituted phenols having two or three phenolic hydroxy groups include alkyl-substituted tris- or diphenylol alkanes such as diphenylol propane or diphenylol methane or trisphenylol methane.

In the preparation of the phenolic resins a ratio of from 0.6 to 2, preferably from 0.7 to 1.5, mol of formaldehyde may be employed per mol of phenolic hydroxy groups. The weight ratio of the fatty acid ester to the phenolic compound may range from 1:3 to 3:1.

The acid catalyst employed may for example be oxalic acid, maleic anhydride, p-toluene sulfonic acid, phosphoric acid, wherein the oxalic acid may be preferred.

In order to improve the water-solubility of the compositions according to the invention they may be used in the form of their amine or quaternary ammonium salts, preferably their salts with alkanolamines or alkylamines. Suitable amino compounds include dimethylaminoethanol; mono- or diethanolamine; diethylamine, triethylamine; amines of propanols, butanols or hexanols such as isopropanolamine, dimethylaminopropanol, 2-amino-2-methyl propanol, 2-amino-2-hydroxymethylpropane-1,3-diol or aminomethyl-propane diol.

The compositions according to the invention may be used with particular advantage as binders in aqueous coating solutions for use in electrophoretic deposition. Particularly stable solutions are obtained as, unlike previously described phenolic resins the compositions according to the invention do not have a tendency to crystallise.

The viscosity of the compositions remains substantially constant during the storage and during the electrophoretic deposition process and this is advantageous since it faciliates their manipulation and it makes possible the deposition under constant conditions and it further ensures that a coating of uniform thickness is deposited. Since the electrical conductivity of the compositions is low, ionic deposition is substantially eliminated so that in the course of the deposition the films do not tear even at high voltages. Additionally, the compositions exhibit good throwing power so that a uniform deposition of the films is obtained even with irregularly shaped objects.

It is a further advantage of the compositions according to the invention that the coatings deposited may be hardened simply by oxidative drying of the unsaturated fatty acid components on being left to stand. Thus not only the preparation of the starting materials for the aqueous coating solutions, but also their manipulation and the drying of the deposited coatings is essentially simplified. With this reason it is possible to save wasting of time and energy. Generally, however, the coatings obtained are stoved in order to obtain optimum properties such as good chemical stability. Stoving temperatures of from 150 to 220, preferably from 170 to 190° C. may be used.

In order that the invention may be well understood the following examples are given by way of illustration only.

EXAMPLE 1

A mixture of 300 g. of linseed oil, 50 g. of p-tert. butyl phenol and 15 g. of paraformaldehyde is heated to 90° C. under an atmosphere of an inert gas with stirring. 0.6 g. of oxalic acid is added and the mixture is condensed at 115° C. for 2 hours. Over the next hour the temperature is raised to 220° C. and over a further hour to 260° C., at which temperature it is held until the viscosity of the undiluted mixture (measured at 20° C.) has reached 1000 to 2000 cp. which occurs after 40–60 minutes. 30 g. of fumaric acid are then added and the mixture is held at a temperature of 220–240° C. until the viscosity (as measured on a 50% solution of ethylene glycol monobutylether at 20° C.) is from 100 to 250 cp. The reaction mixture is cooled to 100° C. and the resin is redissolved in ethylene glycol monobutylether to form a solution having a solids content of 85%. 235 g. of this solution are neutralised with from 22 to 32 g. (depending on the acid number) of dimethylaminoethanol or triethylamine and the mixture is diluted with about 240 g. of water. 100 g. of a practically electrolyte-free pigment, e.g. red iron oxide, is added and the mixture is homogenized on a roll mill. For use in electrophoretic coating baths the colour paste formed is adjusted to a solids content of 15% by weight by the addition of deionised water. Coatings may be deposited electrophoretically from such solutions by applying a voltage of 80–200 V and a current density of 1 to 3 ma./cm.² Over a period of 3 minutes a film having a thickness of from 20 to 30μ is deposited. The films obtained have a good quality surface and high elasticity. Their performance in the salt spray test (ASTM B-117-61) and their resistance to sea water is very good.

EXAMPLES 2 to 9

One proceeds in a manner analogous to that described in Example 1 except that the ingredients shown in the following table were used. However in Example 2 the maximum condensation temperature was from 180 to 200° C. instead of 260° C.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A water soluble composition suitable for use as a water-soluble binder comprising the product obtained by reacting
   (I) a mono-olefinically unsaturated at most dicarboxylic acid having no more than 6 carbon atoms with
   (II) a phenolic resin, said phenolic resin being obtained by condensing, in the presence of an acid catalyst,
      (1) an at most trihydric phenol containing not more than one phenolic hydroxy group per benzene nucleus and containing at least one hydrocarbon substituent, the substituents having altogether up to 12 carbon atoms, (2) formaldehyde and (3) an ester of (3a) a fatty acid having from 12–30 carbon atoms and (3b) a polyhydric aliphatic alcohol having 2–14 carbon atoms,
and the water soluble amine and quaternary ammonium salts of this product.

2. A composition as claimed in claim 1 wherein said phenolic resin has a viscosity of from 100 to 800 cp. in a 50% solution in ethylene glycol monobutyl ether at 20° C.

3. A composition as claimed in claim 1 wherein the unsaturated carboxylic acid is at least in part selected from the group consisting of (a) fumaric acid, (b) acrylic acid and (c) methacrylic acid.

4. A composition as claimed in claim 1 wherein the ester of said fatty acid is an ester of a drying or semi-drying oil fatty acid.

5. A composition as claimed in claim 1 wherein from 0.6 to 2 mol of formaldehyde are employed per mol of phenolic hydroxy groups.

6. A composition as claimed in claim 1 wherein the weight ratio of the ester of the fatty acid to the phenolic compound is from 1:3 to 3:1.

7. A composition as claimed in claim 1 wherein the said catalyst is oxalic acid.

8. A water soluble composition suitable for use as a water soluble binder comprising the product obtained by reacting:
   (I) a mono-olefinically unsaturated at most dicarboxylic acid having not more than 6 carbon atoms with
   (II) a phenolic resin, said phenolic resin being obtained by condensing, in the presence of an acid catalyst,
      (1) an at most trihydric phenol containing not more than one phenolic hydroxy group per benzene nucleus and containing at least one hydrocarbon substituent, the substituents having altogether up to 12 carbon atoms, (2) formaldehyde and (3) an ester of (3a) a fatty acid having from 12–30 carbon atoms and (3b) a polyhydric aliphatic alcohol having 2–14 carbon atoms.

9. A water soluble composition suitable for use as a water soluble binder comprising the water soluble amine

| Example No. | Linseed oil | Wood oil | Soya bean oil | Groundnut oil | p-Tert. butylphenol | p-Phenylphenol | p-Nonylphenol | Paraformaldehyde | Oxalic acid | Maleic anhydride | Fumaric acid |
|---|---|---|---|---|---|---|---|---|---|---|---|
| 2 | 300 | | | | 100 | | | 30 | 1 | 50 | |
| 3 | | 300 | | | 100 | | | 30 | 1 | | 50 |
| 4 | | | 300 | | 100 | | | 30 | 1 | 50 | |
| 5 | | | | 300 | 100 | | | 30 | 1 | 50 | |
| 6 | 300 | | | | 150 | | | 37 | 1 | | 60 |
| 7 | 300 | | | | 200 | | | 45 | 1.5 | | 80 |
| 8 | 300 | | | | | 100 | | 30 | 1 | | 50 |
| 9 | | | | | | | 100 | 30 | 1 | | 50 |

Note.—All the coatings deposited from solutions containing the products of Examples 2 to 9 have good physical and chemical properties and quaternary ammonium salts of the product obtained by reacting:
(I) a mono-olefinically unsaturated at most dicarboxylic acid having not more than 6 carbon atoms with:
(II) a phenolic resin, said phenolic resin being obtained by condensing, in the presence of an acid catalyst, (1) an at most trihydric phenol containing not more than one phenolic hydroxy group per benzene nucleus and containing at least one hydrocarbon substituent, the substituents having altogether up to 12 carbon atoms, (2) formaldehyde and (3) an ester of (3a) a fatty acid having from 12-30 carbon atoms and (3b) a polyhydric aliphatic alcohol having 2-14 carbon atoms.

10. A process for preparing a water soluble reaction product wherein (1) an at most trihydric phenol containing at most one phenolic hydroxy group in a nucleus and containing at least one hydrocarbon substituent, the substituents having altogether up to 12 carbon atoms, (2) formaldehyde and (3) an ester of (3a) a fatty acid having 12 to 30 carbon atoms and (3b) a polyhydric aliphatic alcohol having 2 to 14 carbon atoms are condensed in the presence of an acid catalyst and the product thus obtained is further reacted with a monoolefinically unsaturated at most dibasic carboxylic acid having at most 6 carbon atoms.

References Cited
UNITED STATES PATENTS

| | | | |
|---|---|---|---|
| 3,331,730 | 7/1967 | Bean et al. | 260—844 |
| 3,444,112 | 5/1969 | Koga et al. | 260—19 |
| 3,476,668 | 11/1969 | Scheiber et al. | 204—181 |
| 3,519,583 | 7/1970 | Huggard | 260—29.3 |
| 3,536,641 | 10/1970 | Sekmakas et al. | 204—181 |

DONALD E. CZAJA, Primary Examiner

R. W. GRIFFIN, Assistant Examiner

U.S. Cl. X.R.

117—132 B, 161 R; 204—181; 260—29.3, 32.4, 32.6 R